United States Patent [19]

Colvin et al.

[11] Patent Number: 5,523,351

[45] Date of Patent: Jun. 4, 1996

[54] COMPATIBILIZED POLYMERIC SYSTEMS

[75] Inventors: Howard A. Colvin, Tallmadge; Muhanad A. Alsamarraie, Stow; Dane K. Parker, Massillon, all of Ohio

[73] Assignee: The Goodyear Tire & Rubber Company, Akron, Ohio

[21] Appl. No.: 394,865

[22] Filed: Feb. 27, 1995

Related U.S. Application Data

[60] Division of Ser. No. 77,634, Jun. 17, 1993, abandoned, which is a continuation-in-part of Ser. No. 779,472, Oct. 18, 1991, abandoned.

[51] Int. Cl.$^6$ .................................................. C08L 77/00
[52] U.S. Cl. ................... 525/124; 525/63; 525/64; 525/66; 525/67; 525/70; 525/71; 525/74; 525/125; 525/179; 525/931
[58] Field of Search .......................... 525/124, 125, 525/66

[56] References Cited

U.S. PATENT DOCUMENTS 4,745,148  5/1988  Chung et al. ........................ 524/504
5,283,285  2/1994  Akkapeddi et al. .................... 525/67

FOREIGN PATENT DOCUMENTS 58-25338  2/1983  Japan.

*Primary Examiner*—Ana L. Carrillo
*Attorney, Agent, or Firm*—Alvin T. Rockhill

[57] ABSTRACT

The subject invention relates to a process for preparing a compatibilized blend of a first polymer which is a rubber containing free nitrile groups, hydroxyl groups, carboxyl groups, amide groups, amine groups or mercapto groups and a second dissimilar polymer which is a thermoplastic polymer containing nitrile groups, hydroxyl groups, carboxyl groups, amide groups, amine groups or mercapto groups, which comprises reacting a rubber having pendant blocked isocyanate groups bound thereto with the first polymer and the second dissimilar polymer, wherein the compatibilized blend contains from about 55 weight percent to about 75 weight percent of the rubber containing nitrile groups, hydroxyl groups, amide groups, amine groups or mercapto groups.

8 Claims, No Drawings

COMPATIBILIZED POLYMERIC SYSTEMS

This is a Divisional of application Ser. No. 08/077,634, filed on Jun. 17, 1993 (now abandoned), which is a continuation-in-part application of Ser. No. 07/779,472, filed on Oct. 18, 1991 (now abandoned).

BACKGROUND OF THE INVENTION

The most economical way to develop new polymeric products is to blend known polymers. This is much less expensive than developing a new polymer from completely new monomers. To develop a new polymer from monomers may involve developing commercially acceptable methods for the monomer synthesis in addition to the polymer synthesis. Toxicological and environmental concerns are also raised when a new monomer is introduced in commerce. Thus, more and more polymer manufacturers are turning to polymer blends for new products. The difficulty with many polymer blends, however, is that most blends of polymers are grossly incompatible; that is, one achieves the worst possible properties from the component polymers because the polymers do not want to finely disperse and adhere to each other. "Technological Compatibilization" as quoted by Norman Gaylord in the article "Use Surfactants to Blend Polymers" in Chemtech, July 1989, page 435 is "the result of a process or technique for improving ultimate properties by making polymers in a blend less incompatible; it is not the application of a technique which induces thermodynamic compatibility, which would cause the polymers to exist in a single molecularly blended homogeneous phase". This means that the polymers do not have to dissolve in each other to be compatible but the domain size of the two polymers is reduced by whatever process or additive is involved. Typically this "technological compatibility" is achieved by the addition of a small amount of a material called a compatibilizer, which causes the polymers to blend more easily. This results in smaller domain size for the discontinuous phase in the polymer blend, and may lead to improved physical properties. Typically, these are block or graft polymers which incorporate polymer segments which are similar to those polymers which the chemist is trying to blend. An example of this is compatibilization of cellulose and polyethylene with a cellulose-ethylene graft copolymer which will compatibilize that pair of polymers. Another way to compatibilize polymers is to prepare the graft polymer in situ by reaction of a polymer with a reactive functional group with another polymer during the mixing cycle. This is illustrated by the figure:

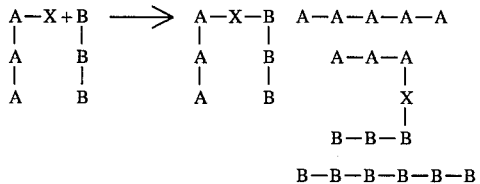

In the figure, the compatibilizer is polymer A containing a reactive functional group X. This group reacts with polymer B to form a graft polymer. This graft polymer acts as a polymeric surfactant to compatibilize polymer A and B.

Polymer blends which take advantage of the best properties of all of the polymers in the blend are very desirable. However, blends which take advantage of the best properties of two or more polymers often cannot be made because the polymers are dissimilar and incompatible. For example, nylon/nitrile rubber blends which exhibit the desirable properties of both the nylon and the nitrile rubber cannot be made by standard blending techniques because nitrile rubber and nylon are very incompatible.

SUMMARY OF THE INVENTION

This invention discloses a technique for compatibilizing one or more dissimilar polymers. It more specifically relates to a process for preparing a compatibilized blend of a first polymer which is a rubber containing free nitrile groups, hydroxyl groups, carboxyl groups, amide groups, amine groups or mercapto groups and a second dissimilar polymer which is a thermoplastic polymer containing nitrile groups, hydroxyl groups, carboxyl groups, amide groups, amine groups or mercapto groups, which comprises reacting a rubber having pendant blocked isocyanate groups bound thereto with the first polymer and the second dissimilar polymer, wherein the compatibilized blend contains from about 55 weight percent to about 75 weight percent of the rubber containing nitrile groups, hydroxyl groups, amide groups, amine groups or mercapto groups.

This invention further discloses a process for preparing a polymer composition having a high modulus which comprises reacting at least one rubber having pendant blocked isocyanate groups bound thereto with at least one thermoplastic polymer containing nitrile groups, hydroxyl groups, carboxyl groups, amide groups, amine groups or mercapto groups.

This invention also reveals a high modulus polymer composition made by reacting at least one rubber having pendant blocked isocyanate groups bound thereto with at least one thermoplastic polymer containing nitrile groups, hydroxyl groups, carboxyl groups, amide groups, amine groups or mercapto groups.

DETAILED DESCRIPTION OF THE INVENTION

The technique of this invention can be used to compatibilize virtually any blend of polymers containing hydroxyl groups, carboxyl groups, amide groups, amine groups or mercapto groups. For example, this invention can be used to compatibilized a blend of nylon with polyester.

The compatibilized blends of this invention can be prepared by simply mixing the polymers with a rubber having blocked pendant isocyanate groups and subsequently heating the mixture to a temperature which is above the deblocking temperature of the blocked isocyanate group. This can be done using conventional mixing techniques, such as in an extruder or a Banburymixer. In most cases, from about 1 to about 10 weight percent of the rubber having blocked pendant isocyanate groups will be included in the blend (based upon the total weight of the blend). It is normally preferred to include from about 2 to about 7 weight percent of the rubber having blocked pendant isocyanate groups in the blend. It is typically more preferred to include from about 3 to about 5 weight percent of the rubber having blocked pendant isocyanate groups in the blend.

The technique of this invention is particularly useful for compatibilizing blends of rubbers with thermoplastic polymers. The rubbers employed in such blends will contain free (unblocked) nitrile groups, hydroxyl groups, carboxyl groups, amide groups, amine groups or mercapto groups. Virtually any type of rubber which contains free (unblocked) nitrile groups, hydroxyl groups, carboxyl groups, amide groups, amine groups or mercapto groups can be used. Such rubbers are generally comprised of repeat units which are derived from one or more conjugated or nonconjugated diene monomers and, of course, also contain free (unblocked) nitrile groups, hydroxyl groups, carboxyl groups, amide groups, amine groups or mercapto groups. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl- 1,3-butadiene, 2-methyl-1,3-pentadiene, 3,4-dimethyl- 1,3-hexadiene, 4,5-diethyl-1,3-octadiene, phenyl-1,3-butadiene and the like. The rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be compatibilized by utilizing the procedure of this invention include polybutadiene rubbers, styrene-butadiene rubbers (SBR), synthetic polyisoprene rubbers, isoprene-butadiene rubbers, isoprene-butadiene-styrene rubbers, nitrile rubbers, polyacrylic rubbers, and carboxylated nitrile rubbers which contain free (unblocked) nitrile groups, hydroxyl groups, carboxyl groups, amide groups, amine groups or mercapto groups.

Virtually any type of thermoplastic polymer containing free nitrile groups, hydroxyl groups, carboxyl groups, amide groups, amine groups or mercapto groups can be employed in the compatibilized blends of this invention. The thermoplastic polymer will normally be a polyester or nylon. However, the thermoplastic polymer can optionally be a polyethylene, a polypropylene, a polybutylene, a polyvinylchloride, a polycarbonate, a polystyrene, a polyurethane, a polyacetal, a styrene-maleic anhydride copolymer resin, a polyethersulfone, a polysulfone or a polyurea containing free (unblocked) nitrile groups, hydroxyl groups, carboxyl groups, amide groups, amine groups or mercapto groups.

The free nitrile groups, hydroxy groups, carboxyl groups, amide groups, amine groups or mercapto groups can be bound to the polymer backbone of the rubber or thermoplastic polymer by grafting or plasma treatment. In some cases, such functional groups can also be bound to the backbone of rubbers and thermoplastic polymers by copolymerizing functional group containing monomers with the other monomers being polymerized in the synthesis of the polymer. For instance, a functionalized polyethylene can be prepared by the copolymerization of ethylene monomer with a small amount of acrylic acid monomer.

Such a compatibilized blend of nitrile rubber with polyester and/or nylon could contain from 5 to 95 weight percent nitrile rubber, 5 to 95 weight percent polyester and/or nylon, and 1 to 10 weight percent of the rubber having blocked pendant isocyanate groups. It is normally preferred for such blends to contain from 55 to 75 weight percent nitrile rubber, from 20 to 40 weight percent polyester and/or nylon, and from 2 to 7 weight percent of the rubber having blocked pendant isocyanate groups. It is typically more preferred for such blends to contain from 60 to 70 weight percent nitrile rubber, from 30 to 40 weight percent of the polyester and/or nylon, and from 3 to 5 weight percent of the rubber having blocked pendant isocyanate groups bound thereto.

The polymers (rubbers) utilized as compatibilizing agents in preparing the compatibilized blends of this invention contain pendant blocked isocyanate groups. These polymers are generally comprised of repeat units which are derived from one or more conjugated or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl- 1,3-butadiene, 2-methyl-1,3-pentadiene, 3,4-dimethyl- 1,3-hexadiene, 4,5-diethyl-1,3-octadiene, phenyl-1,3-butadiene and the like. The rubber having pendant blocked isocyanate groups can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers having pendant blocked isocyanate groups that can be modified by utilizing the procedure of this invention include polybutadiene, styrene-butadiene rubber (SBR), synthetic polyisoprene, isoprene-butadiene rubber, isoprene-butadiene-styrene rubber, nitrile rubber and carboxylated nitrile rubber. Polyacrylic rubbers having pendant blocked isocyanate groups can also be used.

Such rubbers having pendant blocked isocyanate groups bound thereto are comprised of repeat units which are derived from the diene monomer, a blocked isocyanate group containing monomer, and optionally vinyl aromatic monomers. For instance, styrenebutadiene rubber which is comprised of repeat units which are derived from 1,3-butadiene monomer, styrene, and tetrahydro-N-[1-methyl-1-[3-(1methylethenyl)phenyl]ethyl]-2-oxo-1-H-pyrrolo-1-carboxyamide monomer could be utilized. A highly preferred rubber having blocked isocyanate groups bound thereto is nitrile rubber which is comprised of repeat units which are derived from 1,3-butadiene monomer, acrylonitrile monomer and tetrahydro-N-[1-methyl- 1-[3-(1-methylethenyl)phenyl]ethyl]-2-oxo-1-H-pyrrolo- 1-carboxyamide monomer.

Rubbers having pendant blocked isocyanate groups bound thereto can be prepared utilizing a wide variety of techniques. For instance, U.S. Pat. No. 4,429,096 discloses a process wherein the isocyanate group on m-isopropenyl-α,α-dimethylbenzylisocyanate (meta-TMI) is blocked with a cationic carbamic structure and then polymerized into a polymer. The technique disclosed in U.S. Pat. No. 4,429,096 is highly suitable for preparing rubbers having pendant blocked isocyanate groups which can be utilized in accordance with the process of this invention. U.S. Pat. No. 4,604,439 also discloses a technique for incorporating blocked TMI into polymers utilizing emulsion polymerization. The teachings of U.S. Pat. No. 4,429,096 and U.S. Pat. No. 4,604,439 are incorporated herein by reference in their entirety. U.S. Pat. No. 4,694,057 discloses a technique for polymerizing unblocked TMI into rubbers utilizing an emulsion polymerization technique. Such rubbers containing unblocked TMI can be blocked by reacting the rubber containing unblocked TMI with an appropriate blocking agent. In fact, any rubber containing pendant unblocked isocyanate groups can be blocked by reacting the unblocked isocyanate groups thereon with an appropriate blocking agent.

A wide variety of compounds can be utilized to block isocyanate groups in accordance with the process of this invention. Some representative examples of suitable compounds for utilization as blocking agents include phenols, oximes, caprolactam, pyrrolidone, mercaptans and β-keto esters. Blocking agents which can be utilized are discussed in greater detail in Z. Wicks, Journal of Coatings Technology, "Progress in Organic Coatings", Vol. 5, page 73 (1975) and Z. Wicks, Journal of Coatings Technology, "Progress in Organic Coatings", Vol. 9, page 3 (1981), which are incorporated herein by reference in their entirety.

The blocking agents which are preferred for utilization in the process of this invention include alcohols, cyclic amides, ketoximes, phenols, and secondary amines. The cyclic amides which can be utilized typically have the structural formula:

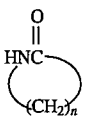

wherein n is an integer from 2 to about 10. It is normally preferred for n to be an integer from 3 to 5. Caprolactam- which has the structural formula:

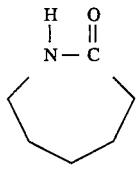

and a deblocking temperature which is within the range of about 110° C. to about 140° C. and 2-pyrrolidone which has the structural formula:

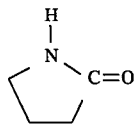

and a deblocking temperature which is within the range of about 160° C. to about 190° C. are highly preferred blocking agents.

The ketoximes which can be utilized as blocking agents typically have the structural formula:

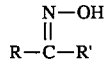

wherein R represents an alkyl group containing from 1 to 10 carbon atoms and wherein R' represents a hydrogen atom or an alkyl group containing from 1 to 10 carbon atoms. Phenol and substituted phenols can also be utilized as the blocking agent. The secondary amines which can be utilized as blocking agents typically have the structural formula:

wherein R represents an aryl group and wherein R' represents an aryl or an alkyl group.

A representative rubber having pendant blocked isocyanate groups bound thereto wherein 2-pyrrolidone is utilized as the blocking agent is depicted as follows:

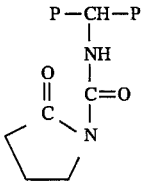

wherein P represents polymer chains of the rubber. A particularly valuable blocking agent is 2-pyrrolidone because it has a deblocking temperature which is within the range of about 160° C. to about 190° C. When the blocked isocyanate is heated to the deblocking temperature, the blocking group is released exposing the free isocyanate. Tetrahydro-N-[1-methyl-1-[3-(1-methylethenyl) phenyl]ethyl]-2-oxo-1-H-pyrrolo-1-carboxamide (TOPC) has the structural formula:

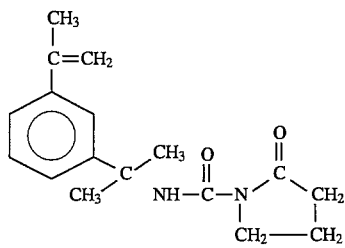

and is an excellent choice as a monomer having pendant blocked isocyanate groups which can be polymerized into polymers, such as rubbers. TOPC is a solid at room temperature and is readily soluble in most monomers commonly used in making synthetic rubber, such as styrene, acrylonitrile, 1,3-butadiene, isoprene, acrylates, vinylidene chloride, and the like. It will also readily polymerize by either solution or emulsion free radical means under a wide variety of conditions with varying initiator systems, such as azo compounds, peroxides, persulfates and redox systems. Additionally, TOPC will not retard normal polymerization rates.

Rubbers having pendant blocked isocyanate groups which are made with TOPC do not deblock at temperatures below about 160° C. This is highly desirable since deblocking at low temperatures can result in premature crosslinking (scorch) during coagulation, drying and/or compounding steps. Rubbers made with TOPC can also be coagulated by utilizing standard procedures.

Rubbers which are made utilizing TOPC as a comonomer have repeat units which are derived from TOPC incorporated therein. These repeat units which are derived from TOPC have the following structure:

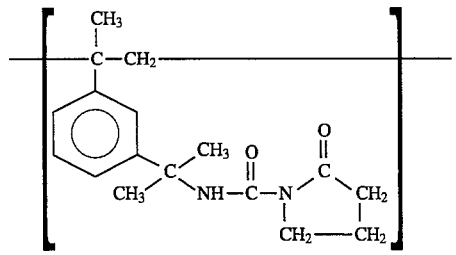

and can be distributed throughout the polymer chains of the rubber in an essentially random manner. Such rubbers will also typically contain repeat units which are derived from conjugated diene monomers, such as isoprene or 1,3-butadiene and can be deblocked by simply heating to temperatures above about 160° C. The deblocking reaction is very fast at temperatures within the range of about 180° C. to about 200° C. As a result of the deblocking reaction, repeat units having the structural formula:

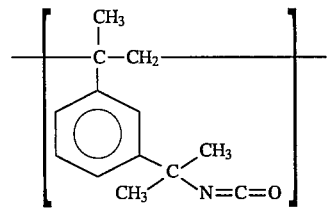

which contain unblocked isocyanate groups are formed and 2-pyrrolidinone (2-pyrrolodone) is liberated.

TOPC monomer can be synthesized by the reaction of TMI with 2-pyrrolidinone. This reaction can be carried out over a very. wide temperature range with temperatures within the range of about 80° C. to 150° C. being typical. It is generally preferred for this reaction to be conducted at a temperature within the range of 90° C. to 120° C. with temperatures in the range of 95° C. to 110° C. being most preferred. In this reaction one mole of TMI reacts with one mole of 2-pyrrolidinone to produce one mole of TOPC. It is normally preferred for a slight excess of 2-pyrrolidinone to be utilized in the reaction. For example, it is advantageous to employ the 2-pyrrolidinone in an excess of about 2 to about 5 mole percent. The reaction product can be mixed into an aliphatic liquid hydrocarbon to induce crystallization of the TOPC. The aliphatic liquid hydrocarbon will normally be an alkane containing from 5 to 10 carbon atoms, such as hexane, pentane, or octane. The ratio of the aliphatic hydrocarbon employed to the reaction product will normally be from 2:1 to 10:1 by volume and will preferably be from 3:1 to 5:1 by volume. U.S. Pat. No. 5,043,455, the teachings of which are incorporated herein by reference, discloses a process for the synthesis of TOPC.

The rubbers having blocked isocyanate groups will typically contain from about 0.001 moles to about 0.4 moles of blocked isocyanate groups per 100 grams of polymer. The rubber having blocked isocyanate groups will preferably contain from about 0.005 moles to about 0.1 moles of blocked isocyanate groups per 100 grams of polymer. Such rubbers will more preferably contain from about 0.01 to about 0.03 moles of blocked isocyanate groups per 100 grins of rubber.

Virtually any type of polyester can be utilized in preparing the high modulus elastomeric composition of this invention. However, the polyesters utilized will normally have a melting point of less than about 240° C. In most cases, it is preferred for the polyester to have a melting point of less than about 200° C.

Polyester elastomers can be used in making the high modulus rubber composition of this invention. Such polyester elastomers will normally have a melting point of less than about 240° C. with it being preferred for the polyester elastomer to have a melting point of less than about 200° C. Such polyester elastomers are widely available on a commercial basis.

For instance, E. I. du Pont de Nemours & Company sells suitable polyester elastomers under the trademark Hytrel™. Dupont Hytrel™ 5555 has been determined to be highly suitable for use as a polyester elastomer in the high modulus rubber compositions of this invention.

The polyester elastomers used in the blends of this invention can contain both polyether and polyester segments. For example, such a polyester elastomer is comprised of the reaction product of (a) terephthalic acid or a dialkyl ester thereof, (b) a dimer acid, (c) a poly(tetramethylene oxide) glycol and (d) 1,4-butane diol. Polyester elastomers of this general type are described in greater detail in U.S. Pat. No. 4,254,001, which is hereby incorporated herein by reference in its entirety. Similar polyester elastomers which additionally contain chain branching agents and ionic compounds are described in U.S. Pat. No. 4,383,106 and U.S. Pat. No. 4,390,687. U.S. Pat. Nos. 2,623,031, 3,023,192, 3,651,014, 3,763,109, 3,766,146, 3,896,078, 4,013,624 and 4,264,761, all of which are incorporated herein by reference in their entirety, also described polyester elastomers and techniques that can be utilized in their preparation.

Virtually any type of nylon can be utilized in preparing the blends of this invention. These nylons are polyamides which can be prepared by reacting diamines with dicarboxylic acids. The diamines and nylons will generally contain from about 2 to about 12 carbon atoms. Nylons can also be prepared by addition polymerization or condensation polymerization.

The nylons which are preferred for utilization in the process of this invention have melting points which are within the range of about 150° C. to about 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of about 175° C. to about 210° C. Some representative examples of such highly preferred nylons include nylon-8, nylon-9, nylon-10, nylon-11, nylon-12, and nylon-12,12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cyclooctane, oxidized to cyclooctanone, converted to the oxime with hydroxylamine, and subjected to the Beckmann rearrangement. Nylon-8 has a melting point of 200° C.

Poly(ω-aminoundecanoic acid), known as nylon-11, can be prepared by the melt polymerization of ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst. ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the ω-dodecanolactam. Nylon-12 has a melting point of 179° C. and is very highly preferred for use as the nylon in the process of this invention.

The nylons used in the process of this invention will typically have number average molecular weight which is within the range of about 8,000 to about 40,000. Such nylons will more typically have number average molecular weights which are within the range of about 10,000 to about 25,000. The nylon utilized will normally not be capped because it is important for it to have free primary amine end groups.

High Modulus Elastomeric Compositions

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

The subject invention discloses a technique for modifying a rubber so as to greatly increase its modulus. This results in the rubber being better suited for applications where a high degree of stiffness is desirable. However, this modification procedure does not generally sacrifice other desirable characteristics of the rubber.

By utilizing the techniques of this invention, elastomeric compositions having highly desirable combinations of properties can be prepared. For instance, rubber compositions which exhibit good tensile strength, elongation, permeability, fuel resistance and morphology can be made. Such rubber compositions can be used to improve the performance characteristics of a wide variety of rubber products.

The subject invention more specifically discloses a process for preparing a rubber composition having a high modulus which comprises reacting at least one rubber having pendant blocked isocyanate groups bound thereto with at least one thermoplastic polymer selected from the group consisting of nylons and polyesters.

The present invention also reveals a high modulus rubber composition made by reacting at least one rubber having pendant blocked isocyanate groups bound thereto with at least one thermoplastic polymer selected from the group consisting of nylons and polyesters.

The high modulus rubber compositions of this invention can be prepared by simply mixing the rubber having blocked pendant isocyanate groups with the nylon or polyester and subsequently heating the mixture to a temperature which is above the deblocking temperature of the blocked isocyanate group. This can be accomplished using conventional mixing techniques. For example, the mixing can be carried out in a Banbury mixer, a mill mixer, or an extruder. In most cases, from about 1 phr (parts per hundred parts by weight of rubber) to about 100 phr of the polyester or nylon will be mixed into the rubber. In most cases, it will be preferred to mix from about 20 phr to about 80 phr of the polyester or nylon into the rubber. It will typically be more preferred to mix from about 35 phr to about 65 phr of the polyester or nylon into the rubber. It is normally preferred to mix the polyester or nylon into the rubber at a temperature which is slightly above the melting point of the polyester or nylon being utilized. This temperature will also typically be above the deblocking temperature of the blocked isocyanate groups which are bound to the rubber.

After being deblocked, the pendant isocyanate groups on the rubber are free to react with carboxyl or hydroxyl end groups on the polyester or amine end groups which are present on the nylon. It is believed that the polyester or nylon graft onto the rubber through this type of reaction. For instance, the reaction between a nylon and a rubber containing pendant isocyanate groups can be depicted as follows:

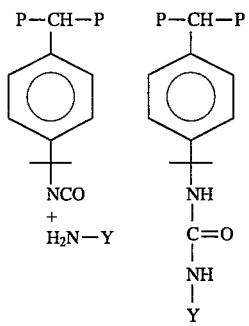

wherein P represents polymer chains of the rubber and wherein Y represents polymer chains of the nylon.

In the case of polyesters, both carboxyl and hydroxyl end groups can react with the isocyanate groups on the rubber. The reaction between such a rubber containing pendant isocyanate groups and a hydroxyl terminated polyester can be depicted as follows:

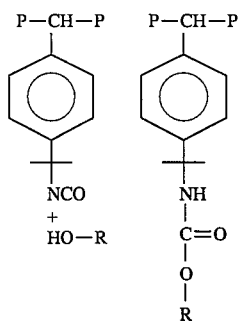

wherein P represents polymer chains of the rubber and wherein R represents polymer chains of the polyester.

In some cases it will be desirable to utilize catalysts which are capable of speeding up both the deblocking reaction and the reaction between the isocyanate groups on the rubber and the carboxyl or hydroxyl end groups on the polyester or amine group on the nylon. For example, tin salts, bismuth components, mercury compounds, tertiary amines, iron acetylacetonate, cobalt acetylacetonate and nickel acetylacetonate can be utilized as the catalyst. Tin salts such as dibutyltin dilaurylate, dimethyltin dilaurylate, dibutyltin diacetate and dimethyltin diacetate are most preferred. Dialkyltin sulfides are also highly preferred catalysts for this purpose.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLE 1

In this experimental, nitrile rubber containing pendant blocked isocyanate groups and a bound antioxidant was prepared. In the procedure utilized, a polymerization was conducted in a ten gallon polymerization reactor, equipped with 2 brumigan agitators which were operated at 200 rpm. The polymerization was carried out by adding 44.52 pounds (20.2 kg) of soft water, 20.65 grams of dodecylbenzene sulfonic acid (surfactant), 20.34 grams of tetrasodium pyrophosphate (electrolyte) and 275.61 grams of the sodium salt of condensed naphthalene sulfonic acid (surfactant). Then 6.52 pounds (2.9 kg) of acrylonitrile, 305.1 grams of TOPC (Tetrahydro-N-[1-methyl -1- [3-(1-methylethenyl) phenyl] ethyl]-2-oxo-1-H-pyrrolo- 1-carboxamide), 70.17 grams of t-dodecyl mercaptan (chain transfer agent), 55.94 grams of ethylene dimethylacrylate (crosslinker), 147.47 grams of N-(4-anilinophenyl)-methacrylamide (polymerizable antioxidant), 14.99 pounds (6.8 kg) of 1,3-butadiene, 711.9 grams of standard iron solution containing a 6:1:1 molar ratio of ethylene diamine tetraacetic acid: ferric sulfate heptahydrate: sulfuric acid, 8.14 grams of sodium formaldehyde sulfoxylate and 25.43 grams of (44% active) α-pinene hydroperoxide dissolved in 101.7 grams acrylonitrile. The polymerization was initially conducted at a temperature of about 70° F. (21° C.). After a total solids content of 20% was realized, the reaction temperature was increased to about 85° F. (29° C.) with the polymerization temperature being further increased to 100° F. (38° C.) after a total solids content of 28% was reached. The polymerization was shortstopped when the total solids became constant at about 32%. The polymerization was shortstopped by the addition of 30.44 grams of the sodium salt of N,N-diethyl dithiocarbamate and 5.07 grams of N, N- diethyl hydroxylamine in 1.79 pounds (812 g) of soft water.

The latex was subsequently transferred to a degasser-stripper and steam stripped until a residual level of less than about 0.05% acrylonitrile was attained. During this process a large amount of steam was condensed to reduce the solids content of the latex to about 23.2%. The final pH of the latex was about 10.07 and with the coagulum level being nil. The latex had a volume particle size of 85.9 nm (nanometer) with a standard deviation of 15.2 nm and a monodispersity of 1.1. The coagulation solution contains 182.6 pounds (82.8 kg) of water, 410 g of sodium chloride, and 9.0 grams of Nalco 108 (a polyquaternary amine salt). The pH of this solution was adjusted to within the range of about 3 to 4 using a 18% sulfuric acid solution. Then about 23 grams of Irganox™ 1076 (antioxidant) was added to the latex solution which weighed about 63 pounds (28.6 kg). The latex was then slowly added to the coagulation solution under continuous stirring. The coagulum, if any, was filtered off using cheese cloth and thoroughly washed with soft water. The product was dried in a circulating air oven at 170° F. (77° C.). The Mooney ML-4' viscosity of the final product or rubber was 80.4.

EXAMPLE 2

In this experimental, nitrile rubber containing bound antioxidant was prepared. In the procedure utilized, a polymerization was conducted in a ten gallon (37.9 liter) polymerization reactor, equipped with 2 brumigan agitators set to operate at 200 rpm. The polymerization was carried out by adding 44.6 pounds (20.2 kg) of soft water, 82.8 grams of a 25% solution of dodecylbenzene sulfonic acid (surfactant), 20.4 grams of tetrasodiumpyrophosphate (electrolytes) and 325.2 grams of a 85% solution of the sodium salt of condensed naphthalene sulfonic acid (surfactant). Then 6.57 pounds (3.0 kg) of acrylonitrile, 70.4 grams of t-dodecyl mercaptan (chain transfer agent), 56.1 grams of ethylene dimethylacrylate (crosslinker), 147.9 grams of N-(4-anilinophenyl)-methacrylamide (polymerizable antioxidant), 15.5 pounds of 1,3-butadiene, 714 grams of a standard iron solution containing a 6:1:1 molar ratio of ethylene diamine tetraacetic acid:ferric sulfate heptahydrate:sulfuric acid, 8.2 grams of sodium formaldehyde sulfoxylate and 11.05 grams of 55% active p-menthane hydroperoxide dissolved in 102 grams of acrylonitrile. The polymerization was initially conducted at a temperature of about 70° F. (21° C.). After a total solids content of 20% was realized, the reaction temperature was increased to about 85° F. (29° C.) with the polymerization temperature being further increased to 100° F. (38° C.) after a total solids content of 28% was reached. The polymerization was shortstopped when the total solids became constant at about 32.2%. The polymerization was shortstopped by the addition of 30.6 grams of the sodium salt of N,N-diethyl dithiocarbamate and 5.1 grams of N,N-diethyl hydroxylamine in 1.8 pound (816 g) of soft water.

The latex was subsequently transferred to a degasser-stripper and steam stripped until a residual level of less than about 0.05% acrylonitrile was attained. During this process, a large amount of steam was condensed to reduce the solids content of the latex to about 23.2%. The final pH of the latex was about 10 and with the coagulum level being nil. The latex had a volume particle size of 96.4 nm (nanometer) with a standard deviation of 17.2 nm and a monodispersity of 1.1. The coagulation solution contains 178 pounds (80.7 kg) of water, 414 grams of sodium chloride, and 9.05 grams of Nalco 108 (a polyquaternary amine salt). The pH of this solution was adjusted within the range of 3 to 4 using 18% sulfuric acid. Then, 22.5 grams of Irganox™ 1076 (antioxidant) was added to the latex solution which weighed about 61 pounds (27.7 kg). The latex was then slowly added to the coagulation solution under continuous stirring. The coagulum, if any, was filtered off using cheese cloth and thoroughly washed with soft water. The product was dried in a circulating air oven at 170° F. (77° C. The Mooney ML-4' viscosity of the final product or rubber was 95.

EXAMPLE 3

In this experiment a core-shell nitrile rubber containing pendant blocked isocyanate groups was synthesized. This synthesis was carried out in a 2-gallon (7.6 liter) polymerization reactor. The polymerization medium was prepared by adding 1,300 grams of warm soft water, 42 grains of molten oleic acid, and 1.4 grams of tetrasodium pyrophosphate and a sufficient amount of a 45% solution of potassium hydroxide to adjust the pH to 9.5. Then 2,000 grams of cold soft. water, 382 grams of acrylonitrile, 6.8 grams of t-dodecyl mercaptan, 7.2 grams of divinylbenzene, 1,340 grams of 1,3 -butadiene, 140 grams of redox initiator solution containing a 6:1:1 molar ratio of ethylene diamine tetraacetic acid:ferric sulfate heptahydrate:sulfuric acid, 0.8 grams of sodium formaldehyde and 80 grams of p-methane hydroperoxide were added. The polymerization was initially carried out at a temperature of about 70° F. (21° C.). After a 20% total solids content was reached, a solution containing 260 grams of acrylonitrile and 4 grams of divinylbenzene was added. The temperature then increased to 85° F. (29° C.). After a total solids content of 25% was reached, the polymerization temperature was increased to 100° F. (38° C.). At a total solids content of 29%, one-half of the ratio in the reactor was removed with the polymerization being terminated by the addition of 3 grams of the sodium salt of N,N-diethyl dithiocarbamate and 0.5 grams of N,N-diethyl hydroxylamine in 80 grams of soft water. The temperature of the remaining polymerization medium was increased to 115° F. (46° C.) with the polymerization being terminated at a total solids content of 37% by the addition of a shortstopping solution containing 3 grams of the sodium salt of N,N-diethyl dithiocarbamate and 0.5 grams of N,N-diethyl hydroxylamine in 80 grams of soft water.

The latex recovered at 29% total solids had a solids content after stripping of 32.6%, a pH of about 11, a coagulum level of 2.1 grams per gallon (0.55 g per liter). It had a volume particle size of 49.7 nm with a standard deviation of 28.4 nm. The polydispersity of the latex was 2.29. The dry rubber recovered from the latex was deemed to have a Mooney ML-4' viscosity of 127.

The latex recovered at 37% solids had a solids content after stripping of 35.9%, a pH of about 11 and a coagulum content of 1.2 grams per gallon (0.32 g per liter). It had a volume particle size of 48.8 nm with a standard deviation of 26.5 nm. It had a polydispersity of 2.24. The dry rubber recovered did not mill or mass together.

EXAMPLES 4–12

In this series of experiments, various blends were prepared utilizing rubbers having pendant blocked isocyanate groups. These blends were prepared in a Brabender mixer which was set to operate at a temperature of 160° C. As the Brabender was operated, the temperatures of the samples increased from about 160° C. to about 200° C. This mixing procedure was conducted utilizing an operating speed of 80 rpm for a period of about 5 minutes. In the procedure utilized, the thermoplastic polymer was introduced first followed by the addition of the unmodified rubber and subsequently by the addition of the rubber containing pendant blocked isocyanate groups.

In these experiments the rubber containing pendant blocked isocyanate groups was prepared according to the procedure specified in Example 1. The polyester utilized was Vitel® 4250, which is sold by The Goodyear Tire & Rubber Company. Table I shows a comparison between the physical properties of various nylon containing blends. Example 4 was conducted as a control and is a sample blend of the nitrile rubber with nylon. Example 5 is a nylon/rubber blend which was compatibilized by the inclusion of 5 parts of the rubber containing pendant blocked isocyanate groups made by the process described in Example 1. Example 6 is another comparative example wherein Kraton FG (a S-EB-S block polymer with a maleated mid-block) was utilized as a compatibilizer for the nylon/nitrile rubber blend.

The compositions of these blends are shown in Table I. Table I also shows the tensile properties, Shore A Hardness and the morphology description of these blends.

TABLE I

| Examples | 4 | 5 | 6 |
|---|---|---|---|
| Composition | 70% NBR 30% Nylon | 65% NBR 30% Nylon 12 5% RPR[1] | 65% NBR 30% Nylon 12 5% Kraton FG |
| Tensile @ Break | 1236 | 1525 | 1442 |
| Elongation @ Break | 98 | 126 | 121 |
| 100% Modulus (psi) | N/A | 1438 | 1420 |
| Shore A Hardness | 84 | 83 | 86 |
| Morphology | Large domains (few microns) Interconnected | 0.25–0.7 micron Irregular shape | About 1 micron Irregular shape |

[1]RPR - blocked isocyanate group containing rubber from Example 1.
[2]N/A - not applicable, the sample broke at 98% elongation.

It is well known that small domain size is an indicator of good polymer compatibility. Thus, the small domain size in Example 5 indicates the utility of the RPR polymer as a compatibilizer as compared to the blend without a compatibilizer and the blend with Kraton FG.

Table II shows the properties of various nitrile rubber/polyester blends.

TABLE II

| Examples | 7 | 8 | 9 |
|---|---|---|---|
| Composition | 70% NBR 30% Polyester | 65% NBR 30% Polyester 5% RPR[1] | 65% NBR 30% Polyester 5% Kraton FG |
| Tensile @ Break | 383 | 433 | 364 |
| Elongation @ Break | 142.5 | 209 | 138.5 |
| 100% Modulus | 336 | 344 | 344 |
| Shore A Hardness | 65 | 67 | 68 |
| Morphology | Large domains (ca. 1 micron) Interconnected | 2 domains 1–1.5 microns & 0.15–0.3 microns | 2 domains: Long domains (several microns × 0.3 microns). Spherical domains, (0.3 micron) |

[1]RPR - blocked isocyanate group containing rubber from Example 1.

Thus, the small domain size in Examples 8 and 9 indicate that both RPR rubber and Kraton FG can be used to compatibilize this blend.

Table III shows the physical properties of various blends which contain both nylon and polyester.

TABLE III

| Examples | 10 | 11 | 12 |
|---|---|---|---|
| Composition | 70% NBR | 65% NBR | 65% NBR |
| | 15% Nylon 12 | 15% Nylon 12 | 15% Nylon 12 |
| | 15% Polyester | 15% Polyester | 15% Polyester |
| | | 5% RPR[1] | 5% Kraton FG |
| Tensile @ Break | 600 | 633 | 600 |
| Elongation @ Break | 114.5 | 107.5 | 84.5 |
| 100% Modulus | 561 | 607 | N/A |
| Shore A Hardness | 73 | 72 | 75 |
| Morphology | 2 domains | Shape: needlelike | Large domains |
| | 1.5–2.0 microns | Dimension: | (few microns) |
| | 0.1–0.35 microns | 0.07–0.50 microns | |

[1]RPR - blocked isocyanate group containing rubber from Example 1.

Thus, the morphology illustrated by the blend in Example 11 shows the superiority of the RPR rubber as a compatibilizer in nylon polyester blends.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a compatibilized blend of a first polymer which is a rubber containing free hydroxyl groups, carboxyl groups, amide groups, amine groups or mercapto groups and a nylon containing hydroxyl groups, carboxyl groups, amide groups, amine groups or mercapto groups which is dissimilar and incompatible with the first polymer, which comprises reacting a rubber having pendant blocked isocyanate groups bound thereto with the first polymer and the nylon, wherein the pendant isocyanate groups on the rubber having pendant blocked isocyanate groups bound thereto are blocked with a member selected from the group consisting of alcohols, cyclic amides, ketoximes, phenols, and secondary amines, and wherein the compatibilized blend contains from about 55 weight percent to about 75 weight percent of the rubber containing carboxyl groups, hydroxyl groups, amide groups, amine groups or mercapto groups, based upon the total weight of the first polymer, the nylon, and the polymer having pendant blocked isocvanate groups.

2. The process as specified in claim 1 wherein the compatibilized blend is made by reacting from about 1 to about 10 weight percent of the rubber having pendant blocked isocyanate groups with the first polymer and the nylon, based upon the total weight of the first polymer, the nylon and the rubber having pendant blocked isocyanate groups.

3. The process as specified in claim 1 wherein from about 2 to about 7 weight percent of the rubber having pendant blocked isocyanate groups is reacted with the first polymer and the nylon, based upon the total weight of the first polymer, the nylon, and the rubber having pendant blocked isocyanate groups.

4. The process as specified in claim 1 wherein the compatibilized blend is made by reacting from about 2 to about 7 weight percent of the rubber having pendant blocked isocyanate groups with the first polymer and the nylon. based upon the total weight of the first polymer, the nylon, and the rubber having pendant blocked isocyanate groups.

5. The process as specified in claim 1 wherein the compatibilized blend is made by reacting from about 3 to about 5 weight percent of the rubber having pendant blocked isocyanate groups with the first polymer and the nylon, based upon the total weight of the first polymer, the nylon, and the rubber having pendant blocked isocyanate groups.

6. The process as specified in claim 1 wherein the rubber having pendant blocked isocyanate groups is comprised of repeat units which are derived from 1,3-butadiene monomer, styrene monomer, and tetrahydro-N-[1-methyl-1[3-(1methylethenyl)phenyl]ethyl]-2-oxo-1-H-pyrrolo-1-carboxamide monomer.

7. The process as specified in claim 1 wherein from about 20 phr to about 80 phr of the nylon is reacted with the rubber having pendant blocked isocyanate groups.

8. The compatibilized blend made by the process of claim 1.

* * * * *